(12) United States Patent
Robinson et al.

(10) Patent No.: US 9,069,341 B2
(45) Date of Patent: Jun. 30, 2015

(54) METHOD AND APPARATUS FOR DIGITAL CONTROL OF A LIGHTING DEVICE

(75) Inventors: Shane P. Robinson, Gibsons (CA); Stefan Poli, Langley (CA)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 1935 days.

(21) Appl. No.: 12/001,642

(22) Filed: Dec. 11, 2007

(65) Prior Publication Data

US 2008/0167734 A1 Jul. 10, 2008

Related U.S. Application Data

(60) Provisional application No. 60/869,534, filed on Dec. 11, 2006.

(51) Int. Cl.
*G05B 13/02* (2006.01)
*G05B 11/42* (2006.01)
*H05B 33/08* (2006.01)

(52) U.S. Cl.
CPC .............. *G05B 13/024* (2013.01); *G05B 11/42* (2013.01); *H05B 33/086* (2013.01); *H05B 33/0869* (2013.01)

(58) Field of Classification Search
CPC .... G05B 11/42; G05B 13/024; H05B 33/086; H05B 33/0869
USPC .............. 700/40–45, 47–50, 75–77; 318/560, 318/609, 610
See application file for complete search history.

(56) References Cited

U.S. PATENT DOCUMENTS

| 4,379,292 | A | | 4/1983 | Minato | |
| 4,745,541 | A | * | 5/1988 | Vaniglia et al. | 700/12 |
| 4,858,219 | A | | 8/1989 | Yoshikawa | |
| 4,864,490 | A | * | 9/1989 | Nomoto et al. | 700/37 |
| 4,962,687 | A | | 10/1990 | Belliveau | |
| 5,019,747 | A | | 5/1991 | Morita | |
| 5,073,863 | A | | 12/1991 | Zhang | |
| 5,214,576 | A | * | 5/1993 | Tani et al. | 700/42 |
| 5,329,431 | A | | 7/1994 | Taylor | |
| 5,406,176 | A | | 4/1995 | Sugden | |

(Continued)

FOREIGN PATENT DOCUMENTS

| CA | 2104738 | 8/1993 |
| CA | 2258049 | 12/1997 |

(Continued)

OTHER PUBLICATIONS

Ashdown, I. "Radiosity: A Programmer's Perspective", New York, NY: John Wiley & Sons, pp. 200-2082, (1994).

(Continued)

*Primary Examiner* — M. N. Von Buhr
(74) *Attorney, Agent, or Firm* — Yuliya Mathis

(57) ABSTRACT

The present invention provides a method and apparatus for digitally controlling a lighting device which enables a desired lighting device operational set point to be reached in a rapid manner while substantially reducing overshoot and oscillation about the desired lighting device operational set point. In particular the present invention is enabled by a PID controller configured to vary the PID controller parameters based on a relationship based at least in part on the desired lighting device operational set point, the present lighting device operational point or both.

16 Claims, 5 Drawing Sheets

(56) References Cited

U.S. PATENT DOCUMENTS

| | | | |
|---|---|---|---|
| 5,477,449 A * | 12/1995 | Iino | 700/29 |
| 5,570,282 A * | 10/1996 | Hansen et al. | 700/41 |
| 5,758,047 A * | 5/1998 | Lu et al. | 700/28 |
| 5,783,909 A | 7/1998 | Hochstein | |
| 5,971,579 A | 10/1999 | Kim | |
| 6,188,181 B1 | 2/2001 | Sinha | |
| 6,208,073 B1 | 3/2001 | Wang | |
| 6,255,786 B1 | 7/2001 | Yen | |
| 6,331,063 B1 | 12/2001 | Kamada | |
| 6,430,313 B1 | 8/2002 | Smith | |
| 6,441,558 B1 | 8/2002 | Muthu | |
| 6,462,669 B1 | 10/2002 | Pederson | |
| 6,482,004 B1 | 11/2002 | Senn | |
| 6,507,159 B2 | 1/2003 | Muthu | |
| 6,552,495 B1 | 4/2003 | Chang | |
| 6,608,453 B2 | 8/2003 | Lys | |
| 6,617,795 B2 | 9/2003 | Bruning | |
| 6,741,351 B2 | 5/2004 | Marshall | |
| 6,761,470 B2 | 7/2004 | Sid | |
| 6,870,325 B2 | 3/2005 | Bushell | |
| 6,946,984 B2 * | 9/2005 | Rubin et al. | 341/141 |
| 6,975,658 B1 * | 12/2005 | Roach | 372/29.02 |
| 7,019,276 B2 * | 3/2006 | Cloutier et al. | 250/214 AL |
| 7,042,173 B2 | 5/2006 | Huber | |
| 7,140,752 B2 | 11/2006 | Ashdown | |
| 7,161,556 B2 | 1/2007 | Morgan | |
| 7,253,566 B2 | 8/2007 | Lys | |
| 7,587,250 B2 * | 9/2009 | Coogan et al. | 700/17 |
| 2002/0078221 A1 | 6/2002 | Blackwell | |
| 2003/0036807 A1 | 2/2003 | Fosler | |
| 2003/0197632 A1 | 10/2003 | Rubin et al. | |
| 2004/0105264 A1 | 6/2004 | Spero | |
| 2004/0225811 A1 | 11/2004 | Fosler | |
| 2005/0030538 A1 | 2/2005 | Jaffar | |
| 2005/0165498 A1 | 7/2005 | Tanaka | |
| 2005/0289279 A1 | 12/2005 | Fails | |
| 2006/0006821 A1 | 1/2006 | Singer | |
| 2006/0022999 A1 | 2/2006 | Lee | |
| 2006/0066265 A1 | 3/2006 | Plotz | |
| 2006/0077192 A1 | 4/2006 | Thielemans | |
| 2006/0077193 A1 | 4/2006 | Thielemans | |
| 2006/0104058 A1 | 5/2006 | Chemel | |
| 2006/0158881 A1 | 7/2006 | Dowling | |
| 2006/0193133 A1 | 8/2006 | Von Der Brelie | |
| 2006/0226956 A1 | 10/2006 | Young | |
| 2006/0245174 A1 | 11/2006 | Ashdown | |
| 2006/0273741 A1 | 12/2006 | Stalker | |
| 2007/0057829 A1 | 3/2007 | Sugita | |
| 2008/0074059 A1 * | 3/2008 | Ahmed | 315/291 |
| 2009/0299500 A1 * | 12/2009 | Rubin et al. | 700/42 |

FOREIGN PATENT DOCUMENTS

| | | |
|---|---|---|
| CA | 2328439 | 4/1998 |
| CA | 2583355 | 10/2005 |
| CA | 2591205 | 7/2006 |
| EP | 0 482 680 | 4/1992 |
| EP | 1 416 219 | 5/2004 |
| JP | 60163102 | 8/1985 |
| JP | 62015602 B2 | 4/1987 |
| JP | 62079509 A | 4/1987 |
| JP | S634302 A | 1/1988 |
| JP | S6446101 A | 2/1989 |
| JP | 11194633 A | 7/1999 |
| JP | 05088704 | 4/2003 |
| JP | 2004240815 | 8/2004 |
| WO | WO 90/04275 | 4/1990 |
| WO | WO 96/41098 | 12/1996 |
| WO | WO 03/053108 | 6/2003 |
| WO | 2005009085 A1 | 1/2005 |
| WO | WO 2005/025277 | 3/2005 |
| WO | 2005101922 A1 | 10/2005 |
| WO | WO 2006/056066 | 6/2006 |

OTHER PUBLICATIONS

Barnes, B. T. "A Four-Filter Photoelectric Colorimeter," Journal of the Optical Society of America 29, (10), pp. 448-452, (1939).

CIE. 2004. Colorimetry, Third Edition. Publication $N^\tau$ 15:2004. Vienna, Austria: Central Bureau of the CIE.

Elation Professional, Focus Spot 250, Los Angeles, California, Apr. 2005.

Eppeldauer, G. P. "A Reference Tristimulus Colorimeter," Proceedings of the Ninth Congress of the International Color Association of the Optical Engineering Society, SPIE 4421, pp. 749-752, (2002), Bellingham, WA, USA.

Finlayson, G. D. and M. S. Drew, "Constrained Least-Squares Regression in Color Spaces," Journal of Electronic Imaging 6, (4), pp. 484-493, (1997).

http://en.wikipedia.org/wiki/Adaptive_control.

Madore, Colors and Colorimetry (http://www.madore.orq/~david/misc/color/).

Malacara, D. 2002. Color Vision and Colorimetry: Theory and Applications. Bellingham, WA: SPIE Press, p. 67.

MAZeT GmbH, JenColor: Color Measurement with MCS3 and MCSi via calibration and coefficient matrix, (http://www.micropto.com/download/MAZeT/color%20measurement%20jencolor.pdf).

Rea, M., Ed. 2000, "The IESNA Lighting Handbook", Ninth Edition. New York, NY: Illuminating Engineering Society of North America, p. 27-4.

USITT DMX512/1990 Digital Data transmission Standard for Dimmers and Controllers, "Recommended Practice for DMX512" by Adam Bennette, PLASA, 1994.

Wendell, B. A. and J. E. Farrell, "Water into Wine: Converting Scanner RGB to Tristimulus XYZ" Device-Independent Color Imaging Systems Integration, Proc. SPIE 1909, pp. 92-101, (1993).

Wyzszecki, G., and W.S. Stiles (2000). "Color Science: Concepts and Methods, Quantitative Data and Formulae," New York, NY: Wiley-Interscience.

* cited by examiner

METHOD AND APPARATUS FOR DIGITAL CONTROL OF A LIGHTING DEVICE

RELATED APPLICATIONS

This application claims the benefit of priority under 35 U.S.C. §119(e) to U.S. provisional application Ser. No. 60/869,534, filed Dec. 11, 2006, the subject matter of which is herein incorporated by reference in its entirety.

FIELD OF THE INVENTION

The present invention pertains to the field of control of devices and in particular to digital control of lighting devices, for example solid-state light sources.

BACKGROUND

It is generally known that the transient behaviour of proportional-integral-derivative (PID) controlled systems can be classified into a number of different categories. Depending on the amplitudes, generally referred to as the PID parameters, at which each of the proportional, integral and derivative signals are being amplified by the controller, the output of the system can reach the desired set point in a number of different manners. For example the desired set point can be reached rapidly with some degree of overshoot before settling at the desired level, the desired set point can be reached slowly substantially without overshoot, or the desired set point can be reached in a minimum time period with minimum overshoot, for example. The PID parameters or constants can be chosen in order to achieve a desired transient system behaviour or response time or dead time, and this desired behaviour can be directly related to the type of system being controlled by the PID controller. Systems whose response times are substantially constant and which are intended to be operated within operating conditions which are substantially constant can be effectively controlled by controllers with pre-configured PID constants.

As defined above, the PID parameters for some systems are configured such that a desired set point or operational output of the system is reached in a rapid manner. This can be performed however at the expense of potential overshoot and oscillation at the desired set point. In some systems this can result in a noticeable and undesired variation in the output of the system.

For example, as identified above, overshoot and oscillation about a desired set point can be eliminated by an appropriate choice of the constants for the PID controller, for example setting a high value for the derivative constant. This selection of the derivative constant has the effect of slowing down the approach of the output to the desired set point as the desired set point is reached. In this configuration, the desired set point will be obtained in a relatively slow manner. A problem with this configuration is that for a system which produces undesired and noticeable changes in output may require that the desired set point is reached in a more rapid manner.

Another way of substantially eliminating the overshoot and oscillation about a desired set point is to operate the control system using variable feedback sampling frequencies. For example, the control system can adapt the sampling frequency in accordance with desired user interface readings or in accordance with the state of the system under operating conditions. For example, the control system can increase the feedback sampling frequency during transitions between system states. For example, if the system is a luminaire, the feedback sampling frequency can be adjusted upon the dimming of the luminaire. The increased feedback sampling frequency during a transient period can provide a dynamically more stable control loop. This, however, is typically not a simple solution to the problem.

For example and having specific regard to the use of PID controllers with solid state lighting, a specific problem occurs when controlling the output of the luminaire at low intensity levels, whether it be a change in colour, colour temperature or a change in intensity. The widespread use of digital control techniques in solid-state lighting systems means that many such lights have a limited number of intensity levels, such as $2^8$ (i.e., 256 intensity levels), for example. When changing the intensity, or controlling the intensity of a luminaire at relatively high light outputs, overshoot beyond, or oscillation about the desired set point by a few intensity steps is typically not perceivable to the eye. However, when the desired set point is at the low end of the available intensity range, overshoot beyond, or oscillation about the desired set point by only one or two intensity steps can correspond to perceptible intensity changes, possibly in the range of about 10%. This degree of overshoot and oscillation about a desired set point is typically readily perceivable and can be annoying to some viewers.

As is known, the perceived brightness of LEDs has a non-linear relationship to the radiometric intensities of the LEDs, including for example the Helmholtz-Kohlrausch effect and Bezold-Brücke phenomena. This relationship between perceived brightness and measured luminous intensity is described by, for example, Wyszecki, G., and W. S. Stiles in "Color Science: Concepts and Methods, Quantitative Data and Formulae," New York, N.Y.: Wiley-Interscience, 2000. This relationship results in a perceived non-linear brightness when using linear control parameters. The relationship between perceived brightness and measured illuminance of an object can be approximately represented by Steven's Law and is defined as follows:

$$B = \alpha L^{0.5} \qquad (1)$$

where B is the perceived brightness, $\alpha$ is a scaling constant, and L is the luminance (measured in candela per square meter per steradian) of the illuminated object at a given point on its surface. If for example, square law dimming as based on Steven's law, is not employed during adjustment of the luminous flux output of a luminaire, this non-linear relationship between the perceived intensity and the radiometric brightness of a luminaire can compound the problem of perceived intensity overshoot and/or oscillation at desired set points which represent low intensity levels.

There is therefore a need for a new method and apparatus for digital control of a lighting device, for example a solid state lighting device, in which desired set points can be reached quickly and maintained substantially without perceivable overshoot or oscillation, while operating a feedback sampling loop at constant frequency.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

An object of the present invention is to provide a method and apparatus for digital control of a lighting device. In accordance with an aspect of the present invention, there is provided a method of digital control of a lighting device using a PID controller, the method comprising the steps of: obtaining a desired lighting device operational set point; determining a present lighting device operational point; determining a relationship based at least: in part on the desired lighting device operational set point, the present lighting device operational point or both and comparing the relationship to a predetermined threshold; assigning a first set of values as PID controller parameters when the relationship is above the predetermined threshold; assigning a second set of values as PID controller parameters when the relationship is above the predetermined threshold; and controlling the lighting device using the PID controller with the assigned PID controller parameters.

In accordance with another aspect of the present invention there is provided an apparatus for digital control of a lighting device, the lighting device responsive to one or more control signals, the apparatus comprising: a feedback system configured to monitor one or more operational characteristics of the lighting device; and a PID controller operatively coupled to the lighting device and the feedback system, the PID controller configured to receive one or more feedback signals from the feedback system, the one or more signals indicative of the one or more operational characteristics of the lighting device, the PID controller configured to receive a first signal indicative of a desired lighting device operational set point and determine PID controller parameters based on a predetermined relationship based at least in part on the desired lighting device operational set point, a present lighting device operational point based on the one or more feedback signals or both, the PID controller configured to generate the one or more control signals based on the PID controller parameters; thereby providing digital control of the lighting device.

DETAILED DESCRIPTION OF THE INVENTION

Definitions

Figure 1:
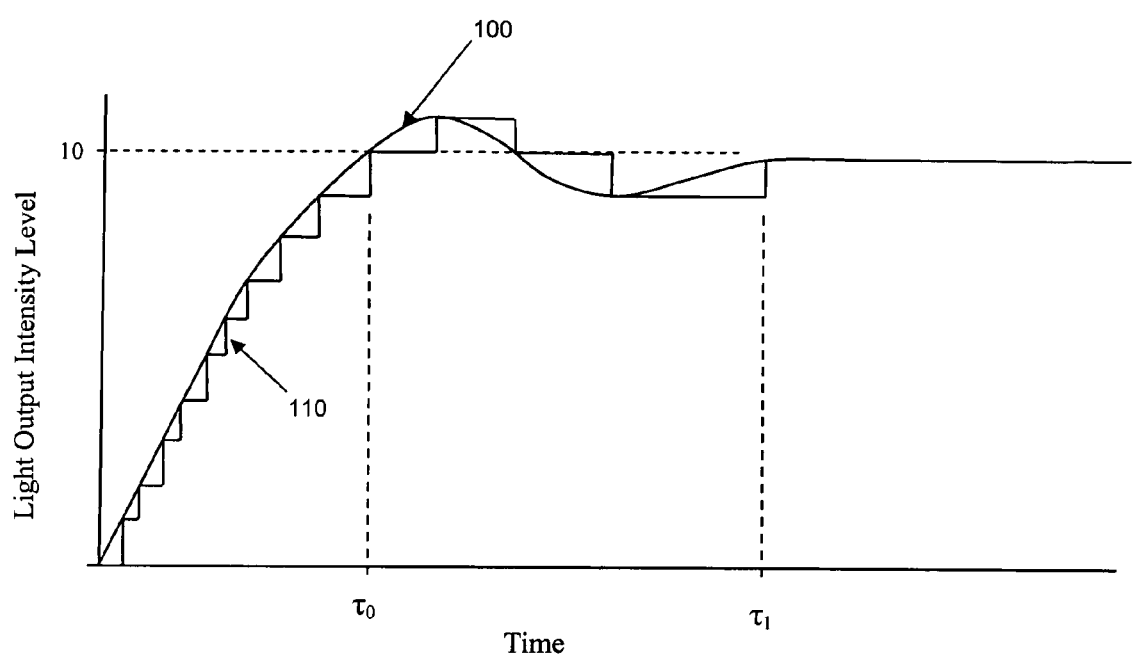
FIG. 1 illustrates the variation of the output of a device being controlled by a PID controller configured to rapidly reach a desired device operational set point.

The term "lighting device" is used to define a device capable of emitting electromagnetic radiation in a region or combination of regions of the electromagnetic spectrum. A lighting device can define a single device that emits the radiation, for example a light-emitting element and can equally be used to define a lighting apparatus or luminaire, or other variations thereof as would be readily understood by a worker skilled in the art.

The term "light-emitting element" (LEE) is used to define a device that emits radiation in a region or combination of regions of the electromagnetic spectrum for example, the visible region, infrared and/or ultraviolet region, when activated by applying a potential difference across it or passing a current through it, for example. Therefore a light-emitting element can have monochromatic, quasi-monochromatic, polychromatic or broadband spectral emission characteristics. Examples of light-emitting elements include semiconductor, organic, or polymer/polymeric light-emitting diodes, optically pumped phosphor coated light-emitting diodes, optically pumped nano-crystal light-emitting diodes or other similar devices as would be readily understood by a worker skilled in the art. Furthermore, the term light-emitting element is used to define the specific device that emits the radiation, for example a LED die, and can equally be used to define a combination of the specific device that emits the radiation together with a housing or package within which the specific device or devices are placed.

The term "present lighting device operational point" is used to define one or more determined operational conditions of a lighting device at a current or present point in time.

The term "desired lighting device operational set point" is used to define one or more operational conditions of a lighting device which are desired. For example, a desired lighting device operational set point can identify one or more of a desired light colour, chromaticity, correlated colour temperature, luminous flux output or the like as would be readily understood by a worker skilled in the art.

The term "current lighting device operational set point" is used to define one or more operational conditions of a lighting device which were selected and resulted in the present lighting device operational point.

As used herein, the term "about" refers to a +/−10% variation from the nominal value. It is to be understood that such a variation is always included in any given value provided herein, whether or not it is specifically referred to.

Unless defined otherwise, all technical and scientific terms used herein have the same meaning as commonly understood by one of ordinary skill in the art to which this invention belongs.

The present invention provides a method and apparatus for digitally controlling a lighting device which enables a desired lighting device operational set point to be reached in a rapid manner while substantially reducing overshoot and oscillation about the desired lighting device operational set point. In particular the present invention is enabled by a PID controller configured to vary the PID controller parameters based on a relationship based at least in part on the desired lighting device operational set point, the present lighting device operational point or both. For example, if a lighting device is operating at present operational point that is beyond a predetermined threshold away from the desired lighting device operational set point, the PID controller is configured to operate using a first set of PID controller parameters, wherein this first set of PID controller parameters may enable substantially rapid approach towards the desired lighting device operational set point. The PID controller is further configured to adjust the PID controller parameters to a different set of PID controller parameters upon reaching the predetermined threshold, wherein the different set of PID controller parameters may enable a slower approach towards the desired lighting device operational set point, thereby reducing overshoot and oscillation thereabout.

The PID controller is operatively connected to the lighting device and a feedback system which is monitoring the operational characteristics of the lighting device, which can be representative of the present lighting device operational point. In this manner the PID controller is provided with the information required to determine if modification of the PID controller parameters is required at a point in time.

The method and apparatus according to the present invention can be used for the control of a variety of different lighting devices, wherein a relatively rapid approach to a desired lighting device operational set point is required while limiting the overshoot and oscillation thereabout. For example, the method and apparatus can be used for the control of a lighting device wherein the output thereof is digitized or the resolution of the feedback loop is relatively coarse when compared to the desired resolution of control of the lighting device. For example, the lighting device can be a solid-state lighting device, or other lighting device requiring digital control thereof, as would be known to a worker skilled in the art.

Feedback System

The feedback system is configured to collect information representative of one or more operational characteristics of the lighting device being controlled. The feedback system comprises one or more sensing units which are configured to collect specific operational information of the lighting device. The sensing units can be optical sensors, temperature sensors, voltage sensors, pressure sensors, strain sensors, or other sensor configuration as would be readily understood by a worker skilled in the art, wherein the sensor configuration is appropriate for the collection of the desired one or more operational characteristics. The configuration of the feedback system is directly dependent on the lighting device itself and the desired type of control required. A worker skilled in the art would readily understand how to configure a feedback system appropriate for a specific lighting device.

For example, if the device is a solid-state lighting device, the feedback system can comprise one or more optical sensors, which are configured to collect information representative of the output generated by the lighting device. The feedback system may additionally comprise one or more temperature sensors configured to collect information representative of the operational temperature of one or more of the light-emitting elements within the solid-state lighting device.

In one embodiment, the feedback system further comprises one or more filters, amplifiers or other electronic components for manipulation and refinement of the information collected by the one or more sensing units.

PID Controller

The PID controller is operatively coupled to the feedback system and the lighting device, wherein based on a set of PID controller parameters, the PID controller generates one or more control signals for controlling the operation of the lighting device. In one embodiment, the PID controller is configured within a control system which can be a microcontroller, microprocessor or other digital signal processing system as would be readily understood by a worker skilled in the art. In another embodiment the PID controller is configured as a standalone microcontroller, microprocessor or other digital signal processing system operatively coupled to a control system. The PID controller is additionally configured to access memory which can store instructions for example control programs such as software, microcode or firmware and data. The memory can be configured a RAM, PROM, EPROM, Flash or other memory format as would be readily understood by a workers skilled in the art.

The PID controller is configured to receive one or more feedback signals from the feedback system, wherein the one or more signals are indicative of one or more operational characteristics of the lighting device and these one or more signals enable the PID controller to determine the present lighting device operational point. The PID controller is further configured to receive or identify a signal which is indicative of a desired lighting device operational set point. Based on a predetermined relationship based at least in part on the desired lighting device operational set point, the present lighting device operational point or both, the PID controller is configured to determine a set of PID controller parameters. These PID controller parameters are subsequently used by the PID controller in order to determine one or more control signals for controlling the operation of the lighting device.

The PID controller parameters can be configured as two or more sets of values, wherein a specific set of PID controller values are selected based on the evaluation of a predefined relationship based at least in part on the present lighting device operational point, the desired lighting device operational set point or both. In general there can be a plurality of discrete sets of values, or a set of values can be defined by a continuous function based on a predefined relationship based at least in part on the present lighting device operational point, the desired lighting device operational set point or both.

In one embodiment, the predefined relationship is based on a difference relationship determined between either the present lighting device operational point and the desired lighting device operational set point or the desired lighting device operational set point and the current lighting device operational set point, or both.

In one embodiment of the present invention the PID controller comprises a PID feedback control algorithm. For example, for present lighting device operational points equal to and above a predetermined operational threshold, the PID controller parameters are defined by an initial set of values $P_1$, $I_1$ and $D_1$. These PID controller parameters can be optimized such that the desired level of operation of the lighting device and/or the desired lighting device operational set point can be reached in substantially a minimum amount of time, with substantially small and substantially insignificant and imperceptible overshoot or oscillation in the operation of the lighting device. Furthermore, for present lighting device operational points below the predetermined operational threshold, the PID controller parameters are defined by an initial set of values $P_1$, $I_1$ and $D_1$ if the present lighting device operational point is more than a predetermined amount away from the desired lighting device operational set point. If however, the present lighting device operational point is less than a predetermined amount away from the desired lighting device operational set point, the PID controller parameters are defined by a secondary set values $P_2$, $I_2$ and $D_2$. In this embodiment the initial values and secondary values of the PID controller parameters can be optimized such that the output of the lighting device can reach the desired lighting device operational set point in substantially a minimum amount of time, with substantially small and substantially insignificant and imperceptible overshoot or oscillation in the operation of the lighting device.

In one embodiment of the present invention, the relative values of the PID controller parameter can be defined as follows, wherein $P_1$, $I_1$ and $D_1$ define an initial set of values and $P_2$, $I_2$ and $D_2$ a secondary set of values:

$$P_1 > P_2 \tag{2}$$

$$I_1 > I_2 \tag{3}$$

$$D_1 < D_2 \tag{4}$$

In one embodiment, one, two, or all three of the above defined conditions are met. In addition, if only one or two of these conditions are met, then the initial and final values of the other one or two PID controller parameters which do not meet the above conditions, are defined as equal in the both the initial set of values and the secondary set of values.

For example, FIG. 1 illustrates intensity output changes of a solid-state lighting device in discrete levels from zero to a set point of 10 (arbitrary units), where 10 corresponds to the $10^{th}$ discrete light output intensity level, wherein the PID controller parameters are configured such that the present lighting device operational point approaches the desired lighting device operational set point in a rapid manner, while allowing for overshoot and oscillation thereabout. The output first reaches the desired lighting device operational set point at time $\tau_0$ but continues to oscillate until time $\tau_1$. This oscillation can be perceived and thus would be unwanted at a low intensity level. For example, the same percentage oscillation at a higher desired lighting device operational set point, for example 200, would typically not be visible, and the output would be perceived as settled at the earlier time $\tau_0$. The stepped line 110 defines the actual output of the solid-state lighting device as the output is adjusted in a stepwise manner, and the smooth line 100 defines the output of the solid-state lighting device if output was adjusted in a continuous manner.

Figure 2:
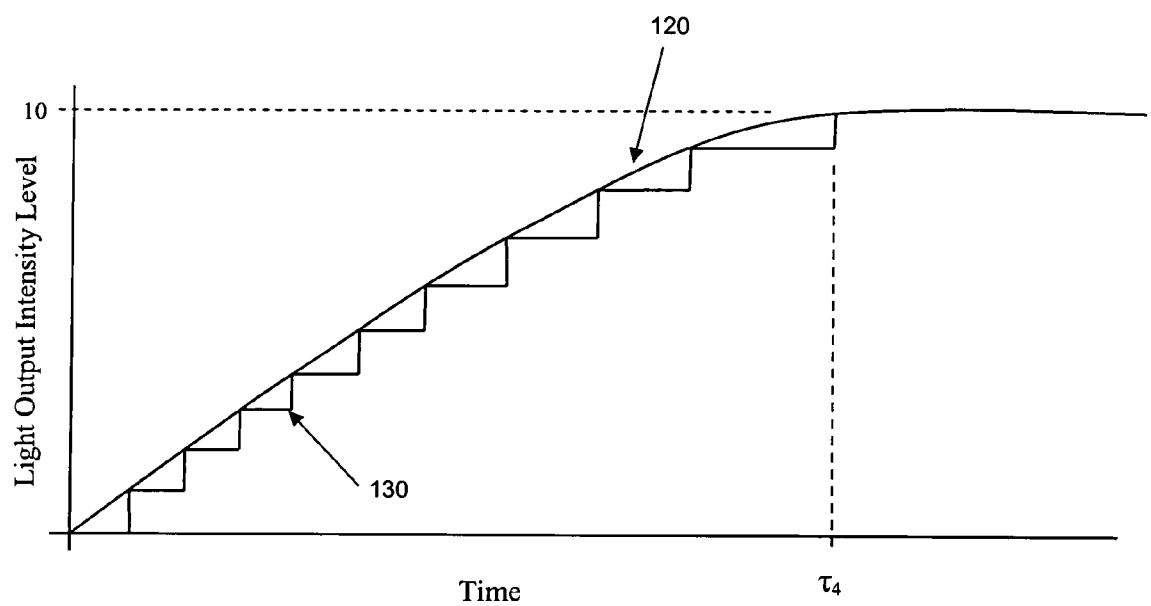
FIG. 2 illustrates the variation of the output of a device being controlled by a PID controller configured to slowly reach a desired device operational set point.

Furthermore, FIG. 2 illustrates how the output intensity of a solid-state lighting device would approach the desired lighting device operational set point if the PID controller parameters were configured to limit overshoot and oscillation about the desired lighting device operational set point. As illustrated, the approach to the desired lighting device operational set point is slow, the desired lighting device operational set point being reached at time $\tau_4$ substantially without overshoot or oscillation. The stepped line 130 defines the actual output of the solid-state lighting device as the output is adjusted in a stepwise manner, and the smooth line 120 defines the output of the solid-state lighting device if output was adjusted in a continuous manner.

Figure 3:
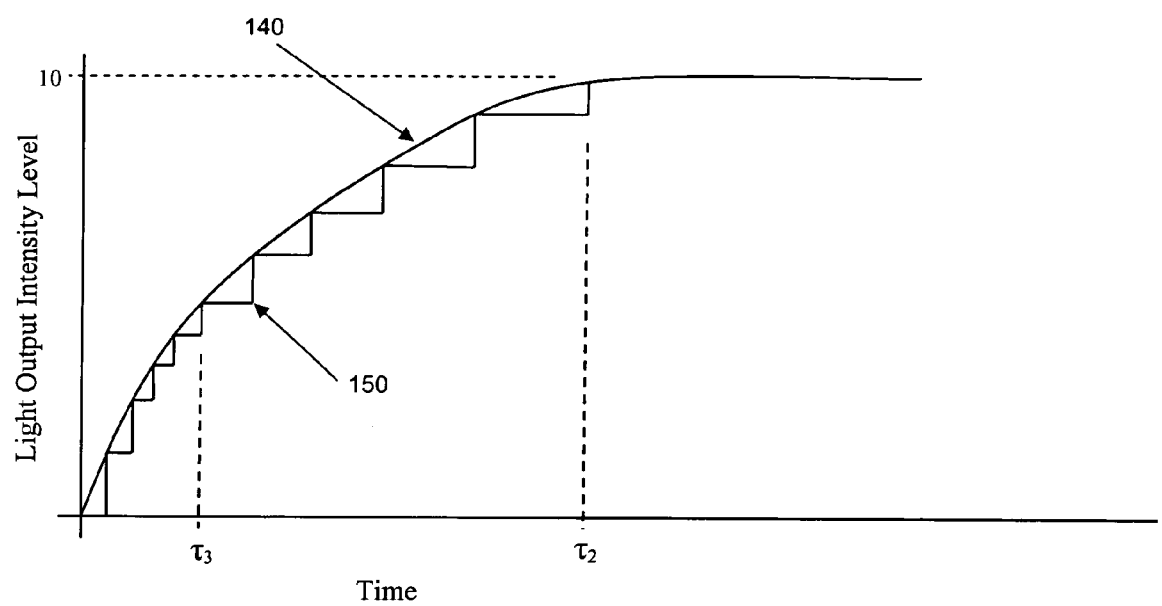
FIG. 3 illustrates the variation of the output of a device being controlled by a PID controller configured in accordance with an embodiment of the present invention.

In addition, FIG. 3 illustrates how the output intensity of a solid-state lighting device would approach the desired lighting device operational set point if the PID controller parameters were defined according to an embodiment of the present invention. At time $\tau_3$ the PID controller parameters are changed from an initial set of values to a secondary set of values, and the rate at which the output intensity approaches the desired lighting device operational set point of 10 can be seen to slow. At time $\tau_2$ the output reaches and settles at the desired lighting device operational set point, substantially without overshoot or oscillation, due to adjustment of the PID controller parameters. In one embodiment of the present invention, the adjustment of the PID controller parameter can include an increased value of the derivative constant. The stepped line 150 defines the actual output of the solid-state lighting device as the output is adjusted in a stepwise manner, and the smooth line 140 defines the output of the solid-state lighting device if output was adjusted in a continuous manner.

As FIGS. 1, 2 and 3 are illustrated in substantially the same scale, it can be identified that $\tau_2$ is less than both $\tau_1$ and $\tau_4$. In addition, as illustrated in FIG. 3, there is substantially no overshoot or oscillation of the output of the solid-state lighting device with respect the desired lighting device operational set point.

In another embodiment of the present invention, the P, I, and D parameters can be dependant upon the desired lighting device operational set point. Fore example, a first set of P, I, D parameters can be selected when the desired luminous flux output from the lighting device is above a predetermined threshold and a second set of P, I, D parameters can be selected when the desired luminous flux output from the lighting device is below the predetermined threshold. For example, the initial set of parameters can be equal: P=0.3, I=0.004 and D=0 and if the desired lighting device operational set point is below a predetermined operational threshold, for example, 10% output which can equate to 10% intensity, the secondary set of values for the PID controller parameters can be determined as follows:

$$P=0.3*0.01*(\text{set point})^2 \quad (5)$$

$$I=0.004*0.01*(\text{set point})^2 \quad (6)$$

$$D=0 \quad (7)$$

wherein the numerical value of a 10% desired lighting device operational set point is 10.

In another embodiment of the present invention, an error-squared PID algorithm can be used determination of the PID controller parameters. For example, one, multiple or all of the initial PID controller parameters can be squared to obtain a secondary set of PID controller parameters. Other integer or non-integer exponents may be used in order to obtain the secondary set of PID controller parameters based on the initial set of PID controller parameters or vice versa, as would be readily understood by a worker skilled in the art. In another embodiment, one, multiple or all of the error terms can be raised to a power other than 1 or 2, including fractional powers less than 1. For example, the P and I terms can be raised to the power of 2, while the D term can be raised to the power of 0.5. This evaluation of the secondary set of PID controller parameters can have the effect of smoothing the transition from high P, high I and low D values to low P, low I and high D values.

Figure 4:
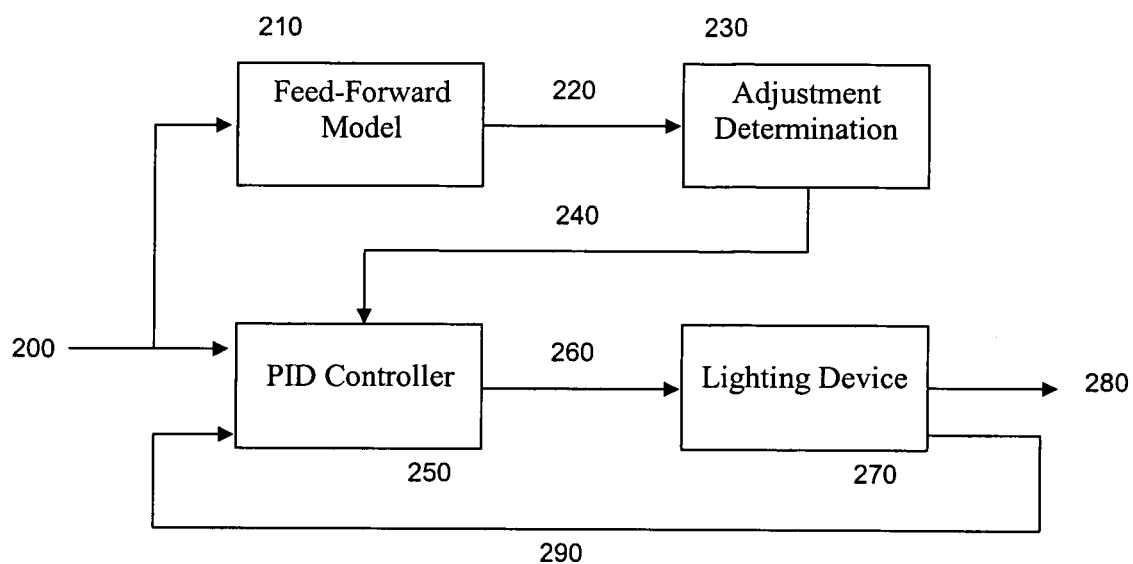
FIG. 4 illustrates a model for adaptive control of the determination of the PID controller parameters according to one embodiment of the present invention.

FIG. 4 illustrates a model for adaptive control of the determination of the PID controller parameters according to one embodiment of the present invention, wherein this model is configured using a feed-forward type format. In particular, the desired lighting device operational set point 200 is received at the PID controller 250, and the feed-forward model 210, wherein the feed-forward model can represent the process being controlled, namely the control of the lighting device, and thus this feed-forward model can simulate the response of the lighting device to various different operational set points. Based on desired light device operation set point, the feed-forward model provides an indication of the expected response 220 of the lighting device to the adjustment determination module 230, which subsequently determines the required adjustment 240 using which the PID controller 250, together with the present lighting device operational point 290 obtained from the feedback system and/or the current lighting device operational set point, can determine the control signals 260 which are to be transmitted to the lighting device 270, thereby controlling the output 280 of the lighting device.

In one embodiment of the present invention, the feed-forward model can be defined as being a straight line when the desired lighting device operational set point has a light intensity level associated with it that falls between about 10% and about 100% of the maximum luminous flux output of the lighting device. As such, if the intensity level falls within these parameters, the modification of the PID controller parameters is not required. Furthermore, when the desired lighting device operational set point that has a light intensity level less than about 10%, the feed-forward model can be defined by another formulation which provides a means for determining modification to the PID controller parameters in order to alleviate the overshoot and/or oscillation about the desired lighting device operational set point. For example, the formulation can be defined by a linear or curvilinear shape, for example straight, exponential, parabolic or other shape, and can be defined by another format of mathematical formulation or model. The formulation may also be represented by a heuristic model or other trial and error method of determining a solution. Other formats of the formulation would be readily understood by a worker skilled in the art.

The above defines a variety of manners in which the PID controller parameters are reevaluated based on one or more different methods. This modification of the PID controller parameters provides a form of adaptive control of the functionality of the lighting device. A number of different adaptive control methods are available, for example methods which use model reference adaptive control (MRAC), model identification adaptive control (MIAC), a neural network, fuzzy logic, heuristic algorithms or models, feedback adaptive control model, feedforward adaptive control model or other methods as would be readily understood by a worker skilled in the art, each of which alone or in a combination thereof can be integrated into one or more embodiments of the present invention.

In embodiments of the present invention, other functional dependencies between the separate P, I and D terms of the PID controller parameters are possible, for example exponential, logarithmic, polynomial or other functional relationship as would be readily understood by a worker skilled in the art. In one embodiment of the present invention, these functional relationships can be implemented digitally by the PID controller, electronics associated with the feedback system, or by analog means. For example, a logarithmic amplifier can be configured using an operational amplifier with a diode in its feedback loop.

Some sensing units inherently have nonlinear responses, for example a logarithmic response, and this inherent characteristic of a sensing unit can be used advantageously in embodiments of the present invention without the need for functionally modifying the input signal from the sensing unit. For example, through the use of substantially unmodified output from a sensing unit for input for the determination of the PID controller parameters, a nonlinear correlation can be realised, which can offer improved performance in terms of minimizing overshoot and oscillation when combined with plural or varying PID parameter sets.

In one embodiment the PID controller parameters are tuned or characterized for each of a plurality of desired lighting device operational set points and these PID control parameters can be stored in a table or other format in memory, which is accessible by the PID controller. Therefore, when a particular desired lighting device operational set point is selected, the PID controller can access the memory and identify the corresponding tuned PID controller parameters associated with that particular desired lighting device operational set point. In one embodiment of the present invention, the PID controller parameters can be tuned using techniques including Ziegler-Nichols and Cohen-Coon.

Alternatively, the PID controller parameters are tuned or characterized for only some desired lighting device operational set points and the remaining PID controller parameters for the other desired lighting device operational set points can be interpolated therebetween using linear interpolation or higher-order interpolation, for example.

The invention will now be described with reference to specific examples. It will be understood that the following examples are intended to describe embodiments of the invention and are not intended to limit the invention in any way.

EXAMPLES

Figure 5:
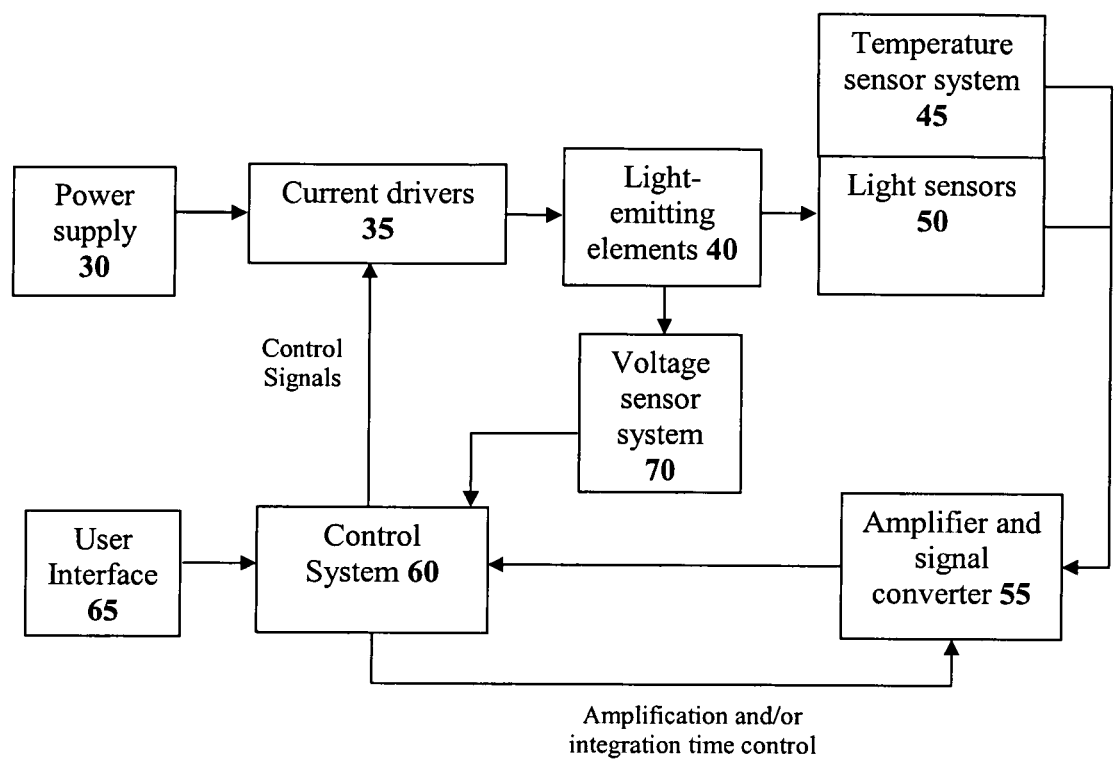
FIG. 5 illustrates the architecture of a control system for a luminaire comprising a PID controller configured in accordance with an embodiment of the present invention.

FIG. 5 illustrates the architecture of a feedback and control system for a luminaire or solid-state lighting device which comprises the method and apparatus for digital control according to one embodiment of the present invention. The luminaire comprises one or more light-emitting elements 40 for the generation of light, wherein the light-emitting elements 40 are electrically connected to the power supply 30 via the current drivers 35. The power supply 30 can be for example, based on an AC/DC or DC/DC converter. If there are multiple colours of light-emitting elements, separate current drivers 35 can be provided for each colour, thereby enabling the supply of the necessary forward currents to each of the colours of light-emitting elements 40.

One or more light sensors 50 are provided for detecting luminous flux output from the luminaire. In one embodiment, separate light sensors 50 are provided for each colour of the light-emitting elements 40. In addition, a colour filter can be associated with one or more of the light sensors 50. Each light sensor 40 is electrically connected to an amplifier and signal converter 55 which can convert the sensed signal into an electrical signal that can be processed by the control system 60. In one embodiment the control system 60 can control the amplification and integration control signals of the amplifier and signal converter 55. It is understood, that each light sensor 50 can detect an amount of luminous flux which is sufficient to provide a stable photocurrent which provides a signal having a minimum required signal-to-noise ratio. Furthermore, the light sensors 50 can be shielded such that stray or ambient light cannot be detected thereby, although in one embodiment it is advantageous to detect the ambient light, for example daylight.

In one embodiment, a user interface 65 is coupled to the control system 60 and provides a means for obtaining information relating to a desired colour temperature, chromaticity and/or desired luminous flux output for the luminaire from a user or other control device, such as for example a programmable 24-hour timer or a theatrical lighting console. This information is converted into appropriate electrical reference signals for use by the control system 60. The control system 60 additionally receives feedback data from the light sensors 50 relating to the luminous flux output from the luminaire. The control system 60 can thereby determine appropriate control signals for transmission to the current drivers 35 in order to obtain the desired luminous flux and chromaticity of light to be produced by the luminaire. The control system 60 can be a microcontroller, microprocessor or other digital signal processing system as would be readily understood by a worker skilled in the art.

In one embodiment, as illustrated in FIG. 5 the control system 60 can optionally be operatively coupled to one or more temperature sensor elements 45. The temperature sensors 45 can provide information about the temperature of the light-emitting elements 40 under operating conditions. Information about the temperature of the light-emitting elements 40 can be used to compensate for temperature-dependent luminous flux fluctuations and LED dominant wavelength shifts. For example, the temperature of light-emitting elements 40 can be determined by measuring the forward voltage of a group of light-emitting elements, the resistance of a thermistor, or the voltage of a thermocouple. Consequently, the control system 60 can control the current drivers 35 to adapt the drive current for the group of light-emitting elements 40 in a feed-forward manner.

Similarly, one or more temperature sensor elements 45 can provide information about the ambient temperature of the light sensors 50 under operating conditions. This information can be used to compensate for temperature-dependent changes in the light responsivities in a feed-forward manner.

In one embodiment, the control system 60 responds to signals from both the light sensors 50 and the temperature sensors 45, as a digital feedback control system 60 responding to only the light sensors 50 can exhibit less long-term stability in the maintenance of constant luminous flux output and chromaticity.

In another embodiment, as illustrated in FIG. 5 the control system can optionally comprise one or more voltage sensor elements 70 that are connected to and detect the forward voltage of the light-emitting elements 40. The voltage sensor signals can be filtered with a bandpass filter whose center frequency is equal to twice that of the AC line frequency. The sampling frequency of the voltage sensor signals is typically greater than about 300 Hz in order to minimize visual flicker.

The control system 60 incorporates a modified PID feedback control algorithm. For desired device operational set points equal to and above 10% of the maximum light output of the luminaire, the PID controller parameters are set to the three values $P_1$, $I_1$ and $D_1$. These are optimized such that the output of the luminaire reaches the desired device operational set point in substantially a minimum amount of time, with substantially small and substantially insignificant and imperceptible overshoot or oscillation in the light output.

For desired device operational set points below 10% of the maximum light output of the luminaire, the PID controller parameters are define by an initial set of values $P_1$, $I_1$ and $D_1$ and if the output is more than 5 percentage points away from the desired device operational set point. A final set of values $P_2$, $I_2$ and $D_2$ are used for the PID controller parameters when the output is less than 5 percentage points away from the desired device operational set point. These PID controller parameters can be optimized such that the output of the luminaire reaches the desired device operational set point in the minimum of time, with substantially small and substantially insignificant and imperceptible overshoot or oscillation in the light output. The relative values of the PID controller parameters can be defined as $P_1 > P_2$; $I_1 > I_2$; $D_1 < D_2$. Optionally, one, two, or all three of these conditions can be met. If only one or two of these conditions are met, then remaining PID controller parameters are equal in the initial and final set of values.

In alternate embodiments of the present invention, the intensity level defining the predetermined operational threshold, for transition between a fixed set of PID controller values and a multi-set of values may be at a level other than 10% of the maximum output of the luminaire, such as 7.5% or 15% for example.

In another embodiment, the transition point from an initial set of values $P_1$, $I_1$ and $D_1$ to a final set of values $P_2$, $I_2$ and $D_2$ may occur at relationships between the present device operational point and the desired device operational set point, for example the transition can occur when the output is at a predetermined number of percentage points away from the set point other than 5, such as 3 or 6, for example.

In one embodiment, an initial set of PID controller parameters can be used during output transitions, for example changes in desired colour, colour temperature or intensity, and a secondary set of reduced PID controller parameters can be used during steady state operation at desired device operational set points below 10%, for example. In this manner, output of the solid-state lighting device can have a substantially fast response with substantially no overshoot while allowing a substantially stable steady state output with substantially no oscillation In another embodiment of the present invention, red, green, and blue light from respective light-emitting elements are mixed together via three separate feedback loops and PID controllers, namely one for each colour of light. The condition for changing the respective PID controller parameters can be different for each colour allowing the colour with higher set points to act as normal and the colour with lower set points to use different PID controller parameters.

It is obvious that the foregoing embodiments of the invention are examples and can be varied in many ways. Such present or future variations are not to be regarded as a departure from the spirit and scope of the invention, and all such modifications as would be obvious to one skilled in the art are intended to be included within the scope of the following claims.

We claim:

1. A method of digital control of a lighting device using a proportional-integral-derivative (PID) controller, the method comprising:
   a) obtaining a desired lighting device operational set point;
   b) determining a present lighting device operational point;
   c) determining a relationship based at least in part on the desired lighting device operational set point, the present lighting device operational point or both and comparing the relationship to a predetermined threshold;
   d) assigning a first set of values as PID controller parameters when the relationship is above the predetermined threshold;
   e) assigning a second set of values as PID controller parameters when the relationship is below the predetermined threshold; and
   f) controlling the lighting device using the PID controller with the assigned PID controller parameters.

2. The method of digital control of a lighting device according to claim 1, wherein the first set of values or the second set of values or both are defined discrete sets of values.

3. The method of digital control of a lighting device according to claim 1, wherein the first set of values or the second set of values are defined by continuous functions.

4. The method of digital control of a lighting device according to claim 1, wherein the relationship is indicative of a comparison between the desired lighting device operational set point and the present lighting device operational point.

5. The method of digital control of a lighting device according to claim 1, wherein the relationship is indicative of the desired lighting device operational set point.

6. The method of digital control of a lighting device according to claim 5, wherein the predetermined threshold is indicative of a luminous flux output based on the desired lighting device operation set point.

7. The method of digital control of a lighting device according to claim 6, wherein the second set of PID controller values are dependent on the desired lighting device operational set point.

8. The method of digital control of a lighting device according to claim 1, wherein there are a plurality of sets of PID controller values and each of the sets of PID controller values are tuned for a specific desired lighting device operational set point.

9. The method of digital control of a lighting device according to claim 8, wherein the lighting device has a plurality of specific desired lighting device operational set points, and all of the plurality of specific desired lighting device operational set points has a set of PID controller values configured therefor.

10. The method of digital control of a lighting device according to claim 1, wherein the second set of PID controller values includes one or more values determined from a corresponding value of the first set of PID controller values using a functional relationship there between.

11. The method of digital control of a lighting device according to claim 10, wherein the functional relationship is exponential, logarithmic or polynomial.

12. The method of digital control of a lighting device according to claim 1, wherein the second set of PID controller values are determined using an adaptive control system.

13. The method of digital control of a lighting device according to claim 12, wherein the adaptive control system is configured using model reference adaptive control or model identification adaptive control or a neural network or fuzzy logic or a heuristic model or a feedback adaptive control model or a feed forward adaptive control model.

14. An apparatus for digital control of a lighting device, the lighting device responsive to one or more control signals, the apparatus comprising:
    a) a feedback system configured to monitor one or more operational characteristics of the lighting device; and
    b) a proportional-integral-derivative (PID) controller operatively coupled to the lighting device and the feedback system, the PID controller configured to receive one or more feedback signals from the feedback system, the one or more signals indicative of the one or more operational characteristics of the lighting device, the PID controller configured to receive a first signal indicative of a desired lighting device operational set point and determine PID controller parameters based on a predetermined relationship based at least in part on the desired lighting device operational set point, a present lighting device operational point based on the one or more feedback signals or both, the PID controller configured to generate the one or more control signals based on the PID controller parameters; thereby providing digital control of the lighting device.

15. The apparatus for digital control of a lighting device according to claim 14, wherein the feedback system comprises one or more optical sensors or one or more temperature sensors or one or more voltage sensors, or a combination thereof.

16. The apparatus for digital control of a lighting device according to claim 14, wherein the PID controller is a standalone microcontroller, microprocessor or digital signal processing system.

* * * * *